US012573800B2

(12) United States Patent
Huang et al.

(10) Patent No.: US 12,573,800 B2
(45) Date of Patent: Mar. 10, 2026

(54) BRUSH MODULE FOR A ROTARY TABLE

(71) Applicant: Hiwin Technologies Corp., Taichung City (TW)

(72) Inventors: Li-Wen Huang, Taichung City (TW); Chih-Hao Ho, Taichung City (TW); Yi-Lin Wu, Taichung City (TW); Yi-Min Wu, Taichung City (TW)

(73) Assignee: Hiwin Technologies Corp., Taichung City (TW)

( * ) Notice: Subject to any disclaimer, the term of this patent is extended or adjusted under 35 U.S.C. 154(b) by 295 days.

(21) Appl. No.: 18/498,123

(22) Filed: Oct. 31, 2023

(65) Prior Publication Data

US 2025/0141170 A1 May 1, 2025

(51) Int. Cl.
*H01R 39/64* (2006.01)
*B23H 1/04* (2006.01)

(52) U.S. Cl.
CPC .............. *H01R 39/64* (2013.01); *B23H 1/04* (2013.01)

(58) Field of Classification Search
CPC ................................. H01R 39/26; H01R 39/64
See application file for complete search history.

(56) References Cited

U.S. PATENT DOCUMENTS 3,176,177 A * 3/1965 Huston ................... H02K 5/148
310/247

3,436,578 A * 4/1969 Walter ................... H01R 39/41
310/242
3,579,007 A * 5/1971 Walter ................... H02K 5/148
310/43
3,735,172 A * 5/1973 Battaglia ................ H01R 39/40
310/239

FOREIGN PATENT DOCUMENTS

| | | |
|---|---|---|
| CN | 201134605 Y | 10/2008 |
| CN | 215870142 U | 2/2022 |
| CN | 217009842 U | 7/2022 |
| CN | 217692035 U | 10/2022 |
| CN | 217720205 U | 11/2022 |
| DE | 3142879 A1 | 5/1983 |
| DE | 102005058833 A1 | 6/2007 |
| JP | 2001-126837 A | 5/2001 |
| JP | 2001-245458 A | 9/2001 |

* cited by examiner

*Primary Examiner* — Neil Abrams
(74) *Attorney, Agent, or Firm* — Wang Law Firm, Inc.

(57) ABSTRACT

A brush module for a rotary table includes: a housing, a brush unit, a first pushing unit and a second pushing unit, the brush unit includes a brush disposed in the housing, a conductive wire electrically connected to the brush, and a pushing force for pushing the brush towards the opening of the housing. The first and second pushing units oppositely provided on the housing provide the brush a first and a second pushing forces in opposite directions to resist the lateral thrust generated by friction between the brush and the rotary disk of the rotary table, thereby greatly reducing the vibration, shaking, slipping, line contact and other conditions of the brush caused by high-speed rotation of the rotary disk, avoiding damaging the peripheral surface of the rotary disk, and maintaining good electrical contact between the brush and the rotary disk.

9 Claims, 7 Drawing Sheets

BRUSH MODULE FOR A ROTARY TABLE

BACKGROUND

Field of the Invention

The present invention relates to a rotary table for electrical discharge machining, and more particularly to a brush module for a rotary table.

Description of Related Art

The rotary table for electrical discharge machining is a type of non-contact micro processing equipment that can operate at high speed in liquids and is suitable for high-order discharge, wire cutting, laser, to produce precision parts for automotive, semiconductor, medical and so on.

The rotary table is mainly equipped with a rotary disk and a brush module, and the brush module is in electrical contact with the peripheral surface of the rotary disk, so that the rotary disk remains conductive during rotation. However, the brush module is poorly designed, which causes the brush of the brush module to produce large vibration, shaking, slipping, line contact and so on when the rotary disk is rotating at high speed, and then damages the peripheral surface of the rotary disk, resulting in the defect of poor conduction of the rotary disk.

China Patent No. CN217720205U discloses a carbon brush assembly and motor with the same. An elastic damping assembly is composed of a supporting spring and a damping member, and the elastic damping assembly is only located on one side of the carbon brush box and presses against one side of the carbon brush. This kind of single-damping-direction design can easily lead to excessive friction between the carbon brush and the carbon brush box, which can damage the carbon brush or cause the carbon brush and the carbon brush box to get stuck with each other.

China Patent No. CN215870142U discloses a carbon brush assembly of motor of dust collector. The carbon brush assembly is composed of a carbon brush surrounded with multiple bearing-like rolling balls. When the carbon brush tilts due to high-speed rotation of the contact object, it is easy to cause compression between the shell and the carbon brush, resulting in the defect of the rolling balls getting stuck and self-locked.

SUMMARY

The objective of the present invention is to provide a brush module for a rotary table capable of solving one of the abovementioned problems.

To achieve the above objective, a brush module for a rotary table in accordance with the present invention comprises: a housing including a holding groove, the holding groove including a first surface, a second surface opposite the first surface, a bottom surface located between the first surface and the second surface, and an opening opposite the bottom surface; a brush unit including a brush, a conductive wire, and an elastic member, wherein the brush is disposed in the holding groove and includes a first side facing the first surface, a second side facing the second surface, an end face facing the bottom surface, and a contact surface opposite the end face; the conductive wire is inserted in the housing, the elastic member is sleeved on the conductive wire and pressed between the bottom surface and the end face to provide a force for pushing the brush towards the opening; a first pushing unit disposed in the housing and including a first elastic element and a first pushing member, wherein the first pushing member presses against the first side of the brush and provides a first pushing force from the first surface towards the second surface; and a second pushing unit disposed in the housing and including a second elastic element and a second pushing member, wherein the second pushing member presses against the second side of the brush and provides a second pushing force from the second surface to the first surface.

The advantages of the invention are that the first and second pushing units oppositely provided on the housing provide the brush a first and a second pushing forces in opposite directions to resist the lateral thrust generated by friction between the brush and the rotary disk of the rotary table, thereby greatly reducing the vibration, shaking, slipping, line contact and other conditions of the brush caused by high-speed rotation of the rotary disk, avoiding damaging the peripheral surface of the rotary disk, and maintaining good electrical contact between the brush and the rotary disk. Besides, the brush of the invention further has the function of automatically returning to the original position, thus avoiding the problem of excessive friction between the brush and the rotary disk caused by the tilting of the brush, which may cause the motor of the rotary table to burn out.

Preferably, the rotary table includes a base and a rotary disk that is rotatably disposed on the base and includes a peripheral surface, the housing is fixed on the base, and the contact surface of the brush is in electrical contact with the peripheral surface of the rotary disk.

Preferably, the elastic member is a compression spring and includes a first end pressing against the bottom surface, and a second end pressing against the end surface.

Preferably, the first side of the brush includes a first guiding groove which is pressed by the first pushing member, and the second side of the brush includes a second guiding groove which is pressed by the second pushing member.

Preferably, a cross section of the first guiding groove is in circular arc shape, the first pushing member is a sphere, a radius of the cross section of the first guiding groove of the brush is about 2% larger than that of the first pushing member, a cross section of the second guiding groove is in circular arc shape, the second pushing member is a sphere, a radius of the cross section of the second guiding groove of the brush is about 2% larger than that of the second pushing member.

Preferably, the first pushing unit includes a first body fixed in the housing, a first elastic element disposed in the first body, and a first pushing member disposed in the first body and pushed by the first elastic element, the first pushing member partially protrudes from the first body, the second pushing unit includes a second body fixed in the housing, a second elastic element disposed in the second body, and a second pushing member disposed in the second body and pushed by the second elastic element, and the second pushing member partially protrudes from the second body presses against the second guiding groove on the second side of the brush.

Preferably, a spring constant of the elastic member is K1, a spring constant of the first elastic element and the second elastic element is K2, a compression amount of the elastic member is X1, a compression amount of the first elastic element and the second elastic element is X23, and the following conditions are met: $K2/K1=X1/(20*X23)$.

Preferably, the brush further includes a third side connected between the first side and the second side, an assembly groove formed in the end face, and a filling hole that penetrates the third side and is in communication with the assembly groove, the conductive wire includes a conductive section electrically connected to the brush, the conductive section of the conductive wire is inserted in the assembly groove, and the filling hole, the assembly groove, and the conductive section are filled with a conductive material.

Preferably, the assembly groove of the brush is a threaded groove, the conductive section of the conductive wire is sleeved with a threaded socket, and the threaded socket is screwed in the assembly groove.

Preferably, the housing further includes a third surface connected between the first surface and the second surface, and a fourth surface facing the third surface, the brush further includes a third side that is connected between the first side and the second side and faces the third surface, and a fourth side opposite to the third side, the brush module of the rotary table further includes a third pushing unit and a fourth pushing unit, the third pushing unit is disposed in the housing, and includes a third pushing member which presses against the third side of the brush to provide a third pushing force from the third surface towards the fourth surface, the fourth pushing unit is disposed in the housing and includes a fourth pushing member which presses against the fourth side of the brush to provide a fourth pushing force from the fourth surface towards the third surface.

Preferably, the third side of the brush includes a third guiding groove which is pressed by the third pushing member, and the fourth side of the brush includes a fourth guiding groove which is pressed by the fourth pushing member.

Preferably, a cross section of the third guiding groove is in circular arc shape, a radius of the cross section of the third guiding groove of the brush is about 2% larger than that of the third pushing member, a cross section of the fourth guiding groove is in circular arc shape, and a radius of the cross section of the fourth guiding groove of the brush is about 2% larger than that of the fourth pushing member.

Preferably, the third pushing unit includes a third body fixed in the housing, a third elastic element disposed in the third body, and a third pushing member disposed in the third body and pushed by the third elastic element, the third pushing member partially protrudes from the third body, the fourth pushing unit includes a fourth body fixed in the housing, a fourth elastic element disposed in the fourth body, and a fourth pushing member disposed in the fourth body and pushed by the fourth elastic element, and the fourth pushing member partially protrudes from the fourth body presses against the fourth guiding groove on the fourth side of the brush.

DETAILED DESCRIPTION

Before the invention is described in detail, it should be noted that similar components and parts are indicated by the same number in the following description.

Figure 1:
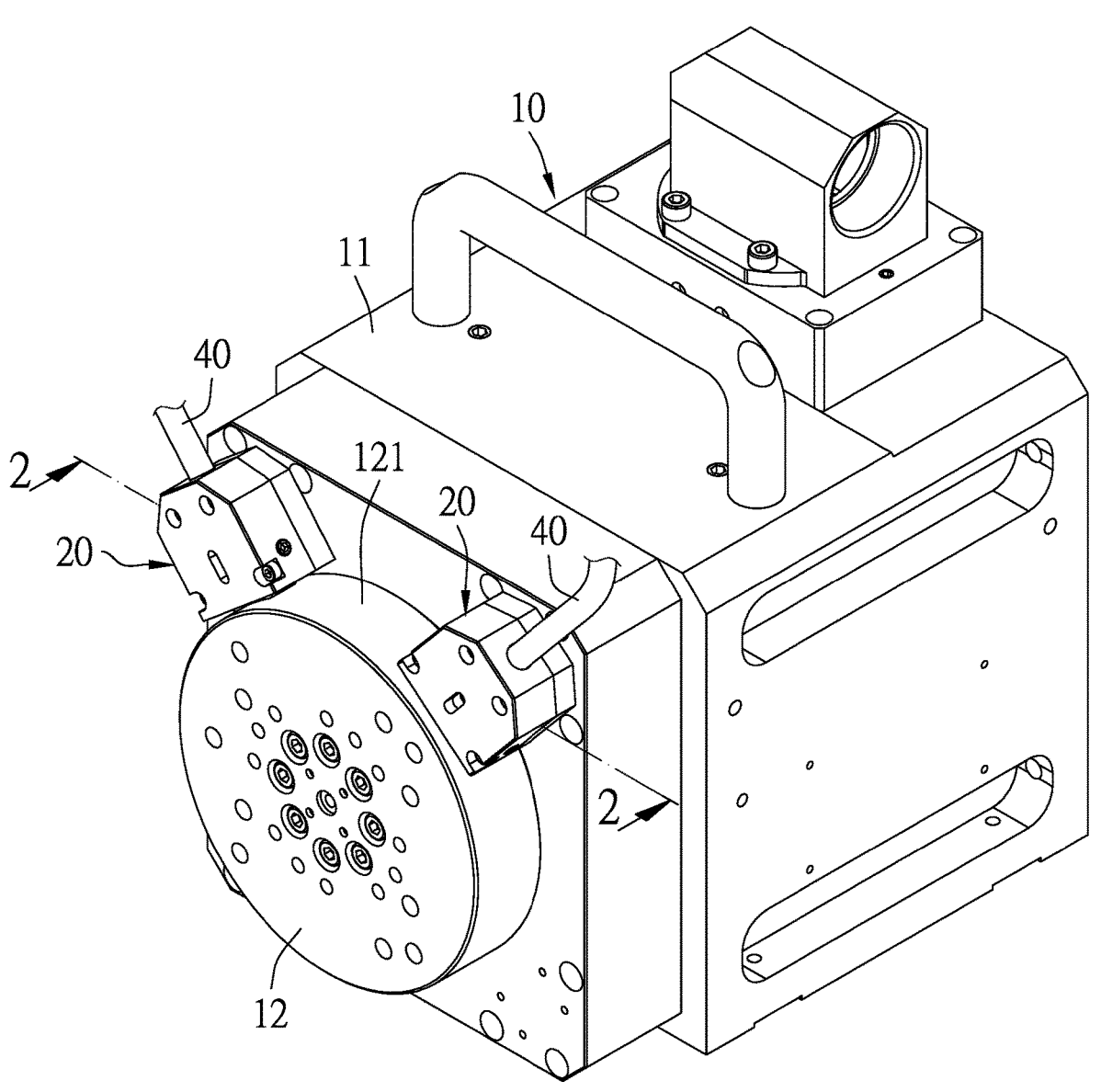
FIG. 1 is a three-dimensional assembly view of a first embodiment of the present invention, displaying the state of the present invention set on the base of the rotary table.
Figure 2:
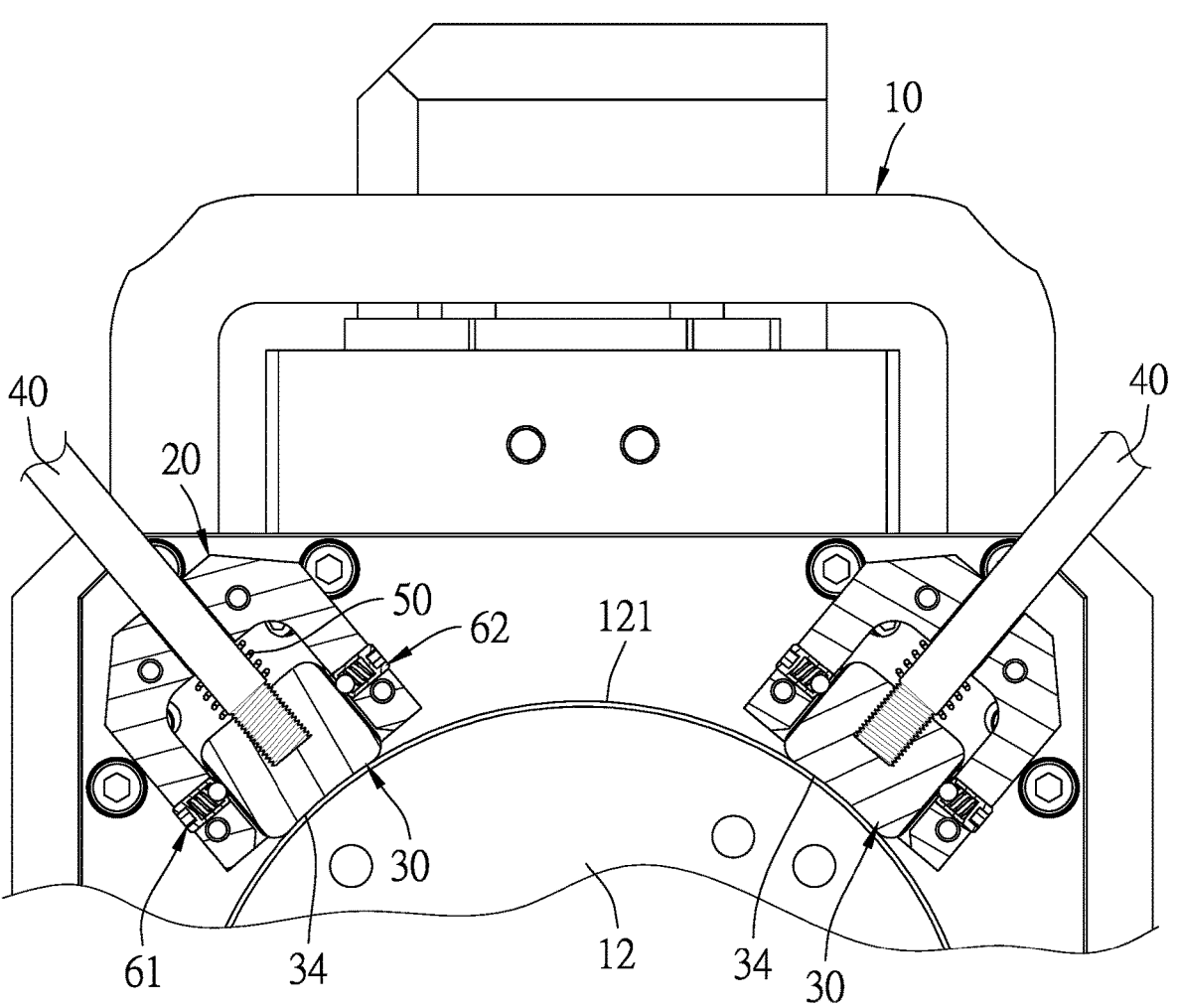
FIG. 2 is a cross-sectional view taken along the line 2-2 in FIG. 1.
Figure 3:
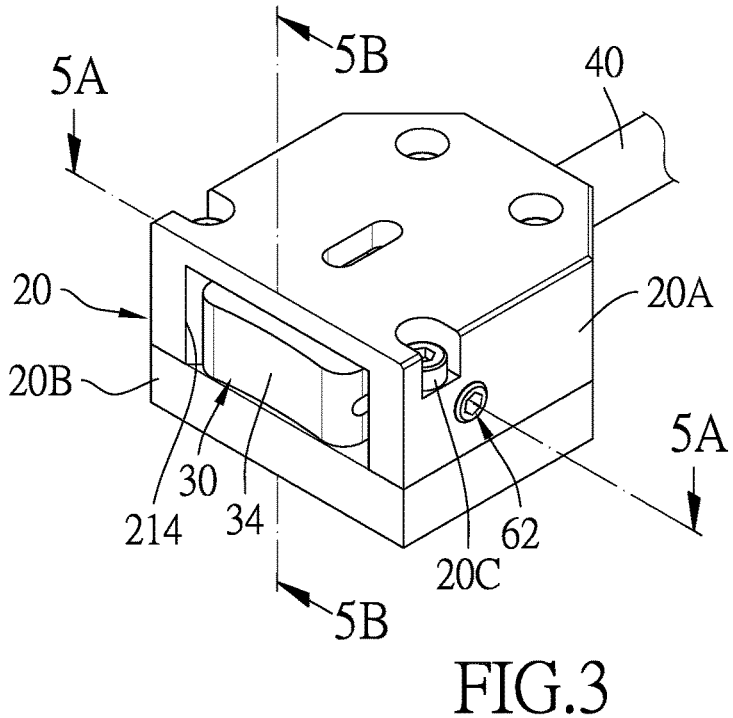
FIG. 3 is a three-dimensional assembly view of the first embodiment of the present invention.
Figure 4:
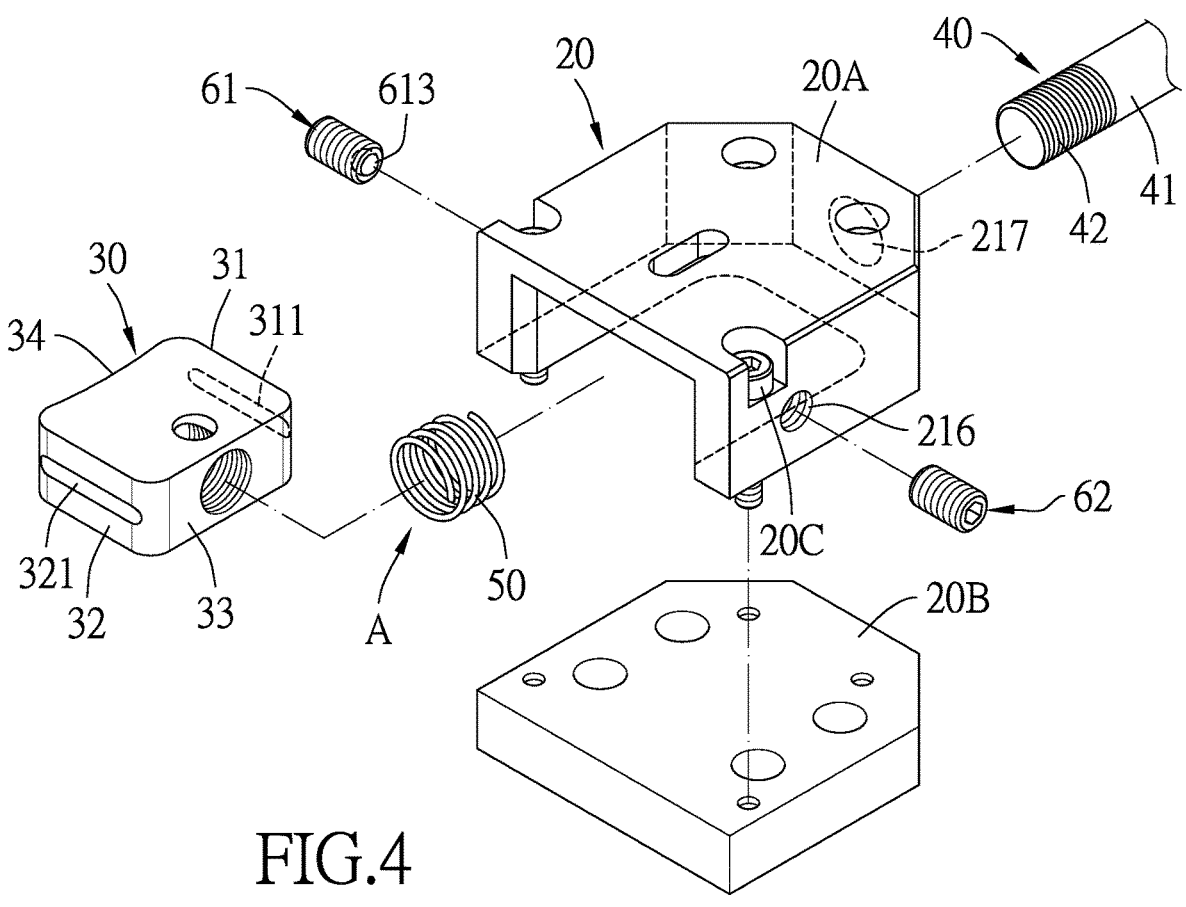
FIG. 4 is a three-dimensional exploded view of the first embodiment of the present invention.
Figure 5A:
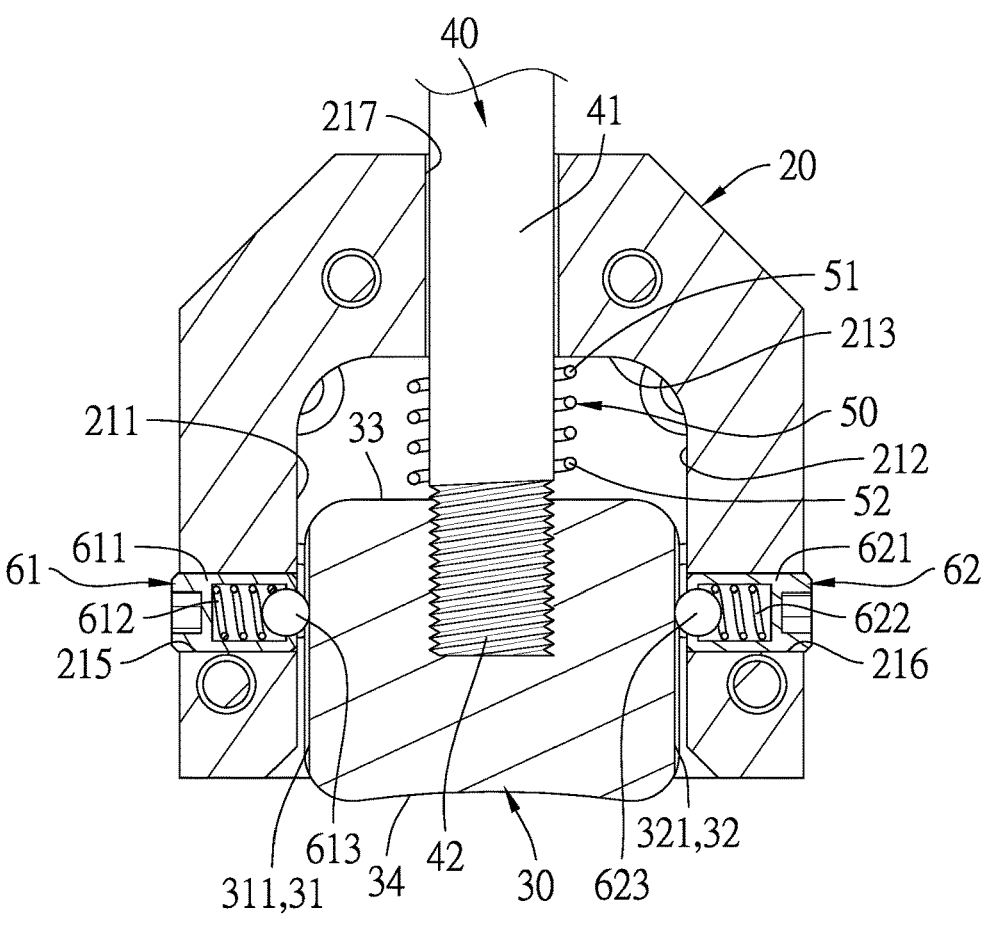
FIG. 5A is a cross-sectional view taken along the line 5A-5A in FIG. 3.
Figure 5B:
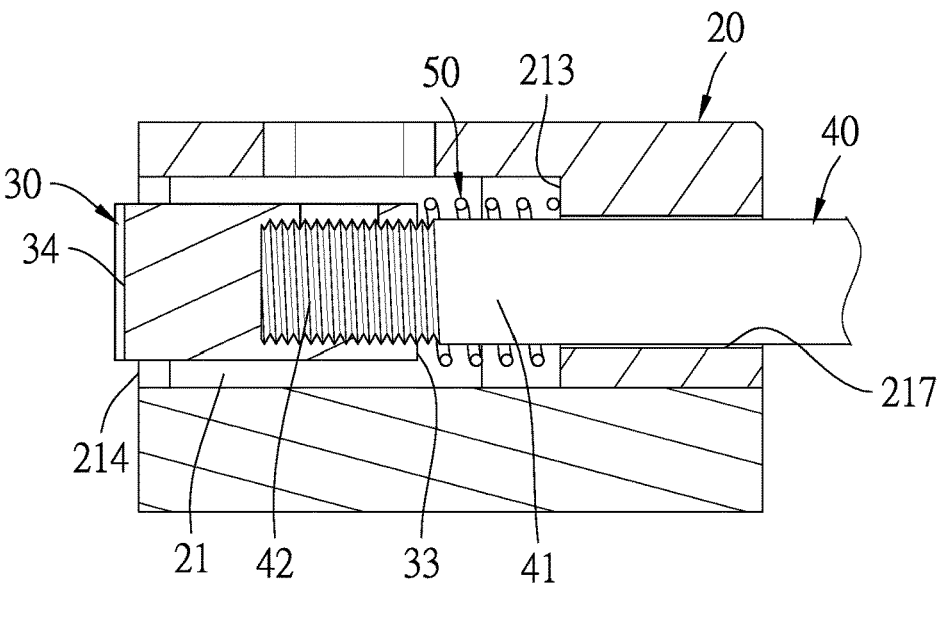
FIG. 5B is a cross-sectional view taken along the line 5B-5B in FIG. 3.

As shown in FIGS. 1 and 2, the first embodiment of the present invention provides a brush module for a rotary table, there are two sets of brush modules, which are suitable for being mounted on the rotary table 10. The rotary table 10 includes a base 11 and a rotary disk 12 that can be rotatably disposed on the base 11 and includes a peripheral surface 121; The following is only the description of one set of this brush module. As shown in FIGS. 3-5B, the brush module essentially includes: a housing 20, a brush unit A, a first pushing unit 61, and a second pushing unit 62.

The housing 20 is fixed on the base 11 and formed by a first housing member 20A and the second housing member 20B locked with screws 20C, and includes a holding groove 21. The holding groove 21 includes a first surface 211, a second surface 212 opposite the first surface 211, a bottom surface 213 located between the first surface 211 and the second surface 212, and an opening 214 opposite the bottom surface 213; In this embodiment, the housing 20 also includes a first hole 215 penetrating the first surface 211, a second hole 216 penetrating the second surface 212, and a bottom hole 217 penetrating the bottom surface 213.

The brush unit A includes a brush 30, a conductive wire 40, and an elastic member 50.

The brush 30 is disposed in the holding groove 21 of the housing 20 and is not in contact with the holding groove 21. The brush 30 includes a first side 31 facing the first surface 211, a second side 32 facing the second surface 212, an end face 33 facing the bottom surface 213, and a contact surface 34 opposite the end face 33 and electrically contacting the peripheral surface 121 of the rotary disk 12; In this embodiment, the first side 31 includes a first guiding groove 311 extending in an elongated direction, and the second side 32 includes a second guiding groove 321 extending in an elongated direction. In addition, the cross-section of the first guiding groove 311 and the second guiding groove 321 is in a circular arc shape.

The conductive wire 40 is inserted in the bottom hole 217 of the housing 20, and includes an insulation section 41 located in the holding groove 21, and a conductive section 42 that extends out of the insulation section 41 and is electrically connected to the brush 30.

The elastic member 50 is sleeved on the insulation section 41 and pressed against the bottom surface 213 and the end face 33 to provide a force for pushing the brush 30 towards the opening 214, so that the contact surface 34 of the brush 30 maintains electrical contact on the peripheral surface 121 of the rotary disk 112; In this embodiment, the elastic member 50 is a compression spring and includes a first end 51 pressing against the bottom surface 213, and a second end 52 pressing against the end surface 33.

The first pushing unit 61 is disposed in the housing 20 and includes a first body 611 fixed in the first hole 215 of the housing 20, a first elastic element 612 disposed in the first body 611, and a first pushing member 613 disposed in the first body 611 and pushed by the first elastic element 612. The first pushing member 613 partially protrudes from the first body 611 and presses against the first guiding groove 311 on the first side 31 of the brush 30. At the same time, the first pushing unit 61 provides a first pushing force to the brush 30 from the first surface 211 towards the second surface 212. The first elastic element 612 in this embodiment is a spring, but it is not limited thereto and can also be other materials with elastic force.

The second pushing unit 62 is disposed in the housing 20 and includes a second body 621 fixed in the second hole 216 of the housing 20, a second elastic element 622 disposed in the second body 621, and a second pushing member 623 disposed in the second body 621 and pushed by the second elastic element 622. The second pushing member 623 partially protrudes from the second body 621 and presses against the second guiding groove 321 on the second side 32 of the brush 30. At the same time, the second pushing unit 62 provides a second pushing force to the brush 30 towards the first surface 211 from the second surface 212. The second elastic element 622 in this embodiment is a spring, but it is not limited thereto and can also be other materials with elastic force.

The above is a configuration description of the main components of the first embodiment of the present invention. The efficacy of the present invention is explained as follows.

Firstly, maintain good electrical contact between the brush 30 and the rotary disk 12. Due to the fact that the first and second pushing units 61, 62 provided on the housing 20 are respectively located on two sides of the brush 30, the first and second pushing forces in opposite directions are provided to the brush 30 to resist the lateral thrust generated by friction between the brush 30 and the rotary disk 12 of the rotary table 10, thereby greatly reducing the vibration, shaking, slipping, line contact and other conditions of the brush 30 caused by high-speed rotation of the rotary disk 12, avoiding damaging the peripheral surface 121 of the rotary disk 12, and maintaining good electrical contact between the brush 30 and the rotary disk 12.

Secondly, the brush 30 has the function of automatically returning to the original position. Due to the fact that the first side 31 and the second side 32 of the brush 30 are respectively provided with a first guiding groove 311 and a second guiding groove 321 with a cross-section of circular arc, and the first pushing member 613 of the first pushing unit 61 and the second pushing member 623 of the second pushing unit 62 respectively press against the circular arc-shaped first guiding groove 311 and the second guiding groove 321, the first pushing unit 61 and the second pushing unit 62 not only provide the opposite first and second pushing forces to the brush 30, but also have the function of automatically returning to the original position through the mutual restriction between the arc-shaped first guiding groove 311 and the first pushing member 613, and between the second guiding groove 321 and the second pushing member 623, avoiding the problem of excessive friction between the brush 30 and the rotary disk 12 caused by the tilting of the brush 30, which may cause the motor (not shown) of the rotary table 10 to burn out. It can further avoid vibration, tilting, and jamming between the housing 20, the first pushing unit 61, the second pushing unit 62, and the brush 30, and effectively reduce the friction force between the brush 30 and the rotary disk 12, so as to reduce the driving current of the rotary table 10 and achieve energy-saving effect.

It is worth mentioning that the radius of the cross section of the first guiding groove 311 of the brush 30 is about 2% larger than the radius of the first pushing member 613, in addition to that the cross-section of the first guiding groove 311 is designed as a circular arc; The radius of the cross section of the second guiding groove 321 of the brush 30 is also about 2% larger than the radius of the second pushing member 623, in addition to that the cross-section of the second guiding groove 321 is designed as a circular arc; so as to ensure that the brush 30 has the function of automatically returning to its original position.

In addition, the spring constant of the elastic member 50 is K1, the spring constant of the first elastic element 612 and the second elastic element 622 is K2, the compression amount of the elastic member 50 is X1, the compression amount of the first elastic element 612 and the second elastic element 622 is X23, and the following conditions are met: K2/K1=X1/(20*X23); When the aforementioned condition is met, the amplitude of shaking of the brush 30 caused by the rotary disk 12 when rotating at high speed can be limited, avoiding collision between the brush 30 and the holding groove 21 of the housing 20 due to excessive shaking amplitude.

Figure 6A:
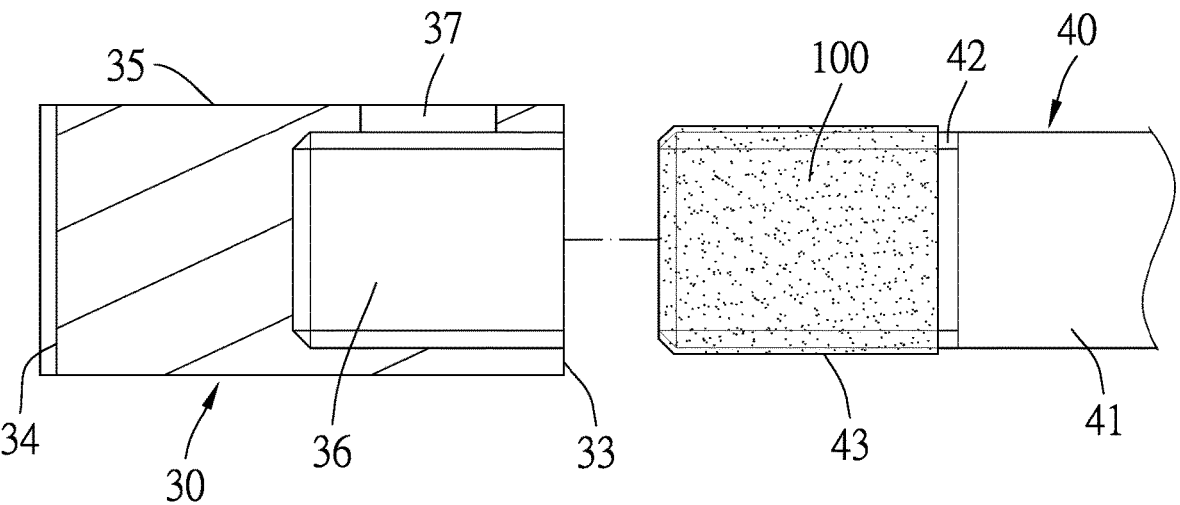
FIG. 6A is an exploded view of a second embodiment of the present invention, showing the state of separation between the brush and the conductive wire.
Figure 6B:
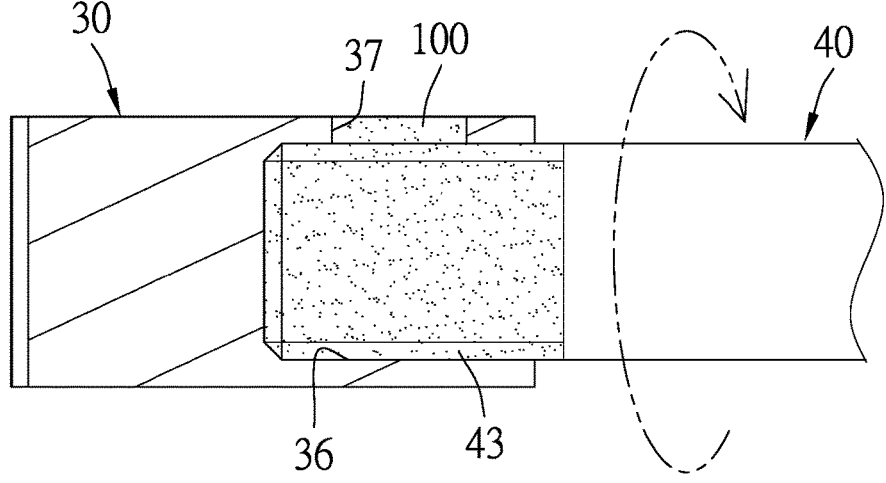
FIG. 6B is a assembly view of the second embodiment of the present invention, showing the combination state of the brush body and the conducting wire.

Referring to FIGS. 6A and 6B, the second embodiment of the present invention provides a brush module for a rotary table, which differs from the first embodiment in that:

The brush 30 further includes a third side 35 connected between the first side 31 and the second side 32, an assembly groove 36 formed in the end face 33, and a filling hole 37 that penetrates the third side 35 and is in communication with the assembly groove 36. The conductive section 42 of the conductive wire 40 is inserted in the assembly groove 36, and the filling hole 37, the assembly groove 36, and the conductive section 42 are filled with conductive material 100, such as tin, but not limited thereto; In this embodiment, the assembly groove 36 of the brush 30 is a threaded groove, and the conductive section 42 of the conductive wire 40 is sleeved with a threaded socket 43, which is screwed in the assembly groove 36.

When the conductive wire 40 is assembled with the brush 30, the conductive material 100 can be pre-welded on the outer surface of the threaded socket 43, and then inserted or screwed into the assembly groove 36 of the brush 30. Subsequently, another piece of conductive material 100 is taken and heated to a molten state, and flows into the assembly groove 36 through the filling hole 37 of the brush 30, and is melted and cooled together with the conductive material 100 on the threaded socket 43 of the conductive wire 40 to complete the electrical connection between the conductive wire 40 and the brush 30, thereby improving the tensile strength. When the brush 30 needs to be replaced, a heating tool is used to heat the conductive material 100 in the filling hole 37 of the brush 30, and the conductive material 100 is melted. Then, the conductive wire 40 and the brush 30 can be rotated and separated from each other to replace the brush 30, so that the conductive wire 40 can be recycled and reused, achieving environmental protection effects.

Figure 7:
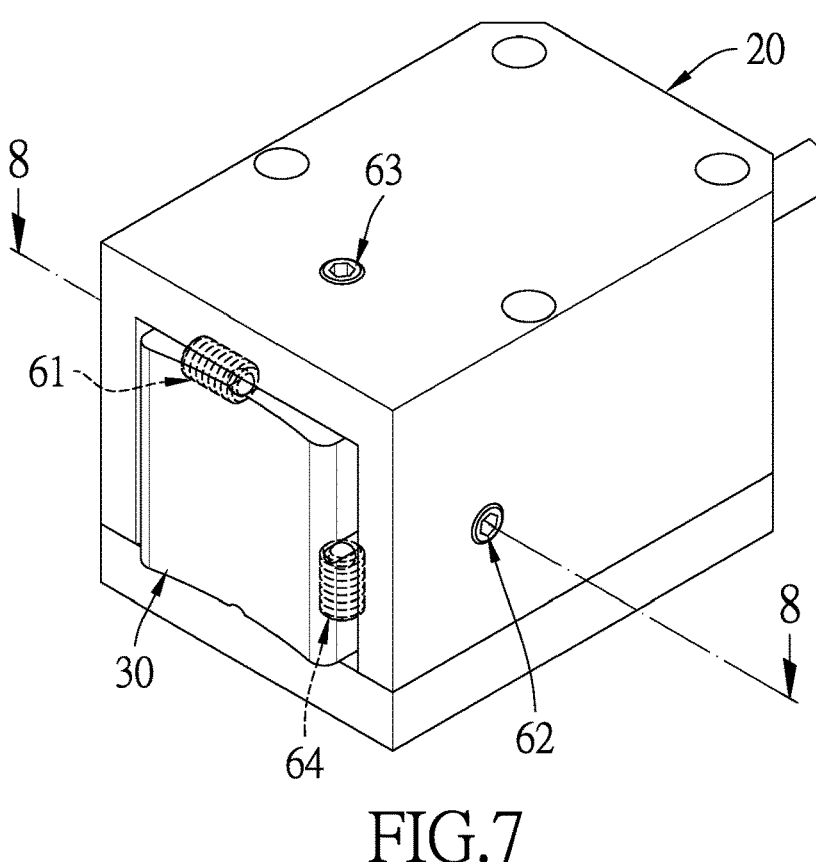
FIG. 7 is a three-dimensional assembly view of a third embodiment of the present invention.
Figure 8:
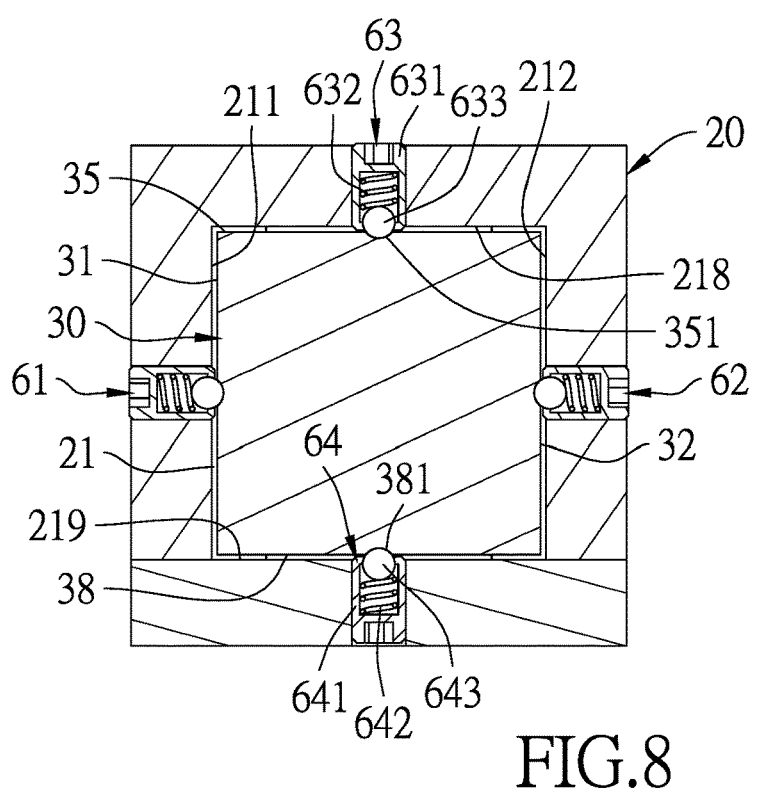
FIG. 8 is a cross-sectional view taken along the line 8-8 in FIG. 7.

As shown in FIGS. 7 and 8, the third embodiment of the present invention provides a brush module for a rotary table, which differs from the first embodiment in that:

The housing 20 further includes a third surface 218 connected between the first surface 211 and the second surface 212, and a fourth surface 219 facing the third surface 218.

The brush 30 further includes a third side 35 that is connected between the first side 31 and the second side 32 and faces the third surface 218, and a fourth side 38 that is opposite to the third side 35; In this embodiment, the third side 35 includes a third guiding groove 351, and the fourth side 38 includes a fourth guiding groove 381.

The brush module of the rotary table 10 further includes a third pushing unit 63 and a fourth pushing unit 64.

The third pushing unit 63 is disposed in the housing 20, and includes a third body 631 fixed in the housing 20, a third elastic element 632 disposed in the third body 631, and a third pushing member 633 disposed in the third body 631 and pressed by the third elastic element 632. The third pushing member 633 partially protrudes from the third body 631 and presses against the third guiding groove 351 on the third side 35 of the brush 30. At the same time, the third pushing unit 63 provides a third pushing force to the brush 30 from the third surface 218 towards the fourth surface 219. The third elastic element 632 in this embodiment is a spring, but it is not limited thereto and can also be other materials with elastic force.

The fourth pushing unit 64 is disposed in the housing 20, and includes a fourth body 641 fixed in the housing 20, a fourth elastic element 642 disposed in the fourth body 641, and a fourth pushing member 643 disposed in the fourth body 641 and pressed by the fourth elastic element 642. The fourth pushing member 643 partially protrudes from the fourth body 641 and presses against the fourth guiding groove 381 on the fourth side 38 of the brush 30. At the same time, the fourth pushing unit 64 provides a fourth pushing force to the brush 30 from the fourth surface 219 towards the third surface 218. The fourth elastic element 642 in this embodiment is a spring, but it is not limited thereto and can also be other materials with elastic recovery force.

By the design of the third and fourth pushing units 63 and 64 with the first and second pushing units 61 and 62, the front, rear, left, and right directions of the brush 30 are supported by a pushing force, which improves the automatic centering effect of the brush 30 and greatly reduces the vibration, shaking, slipping, line contact, tilting and jamming, and other issues of the brush caused by the high-speed rotation of the rotary table.

Figure 9:
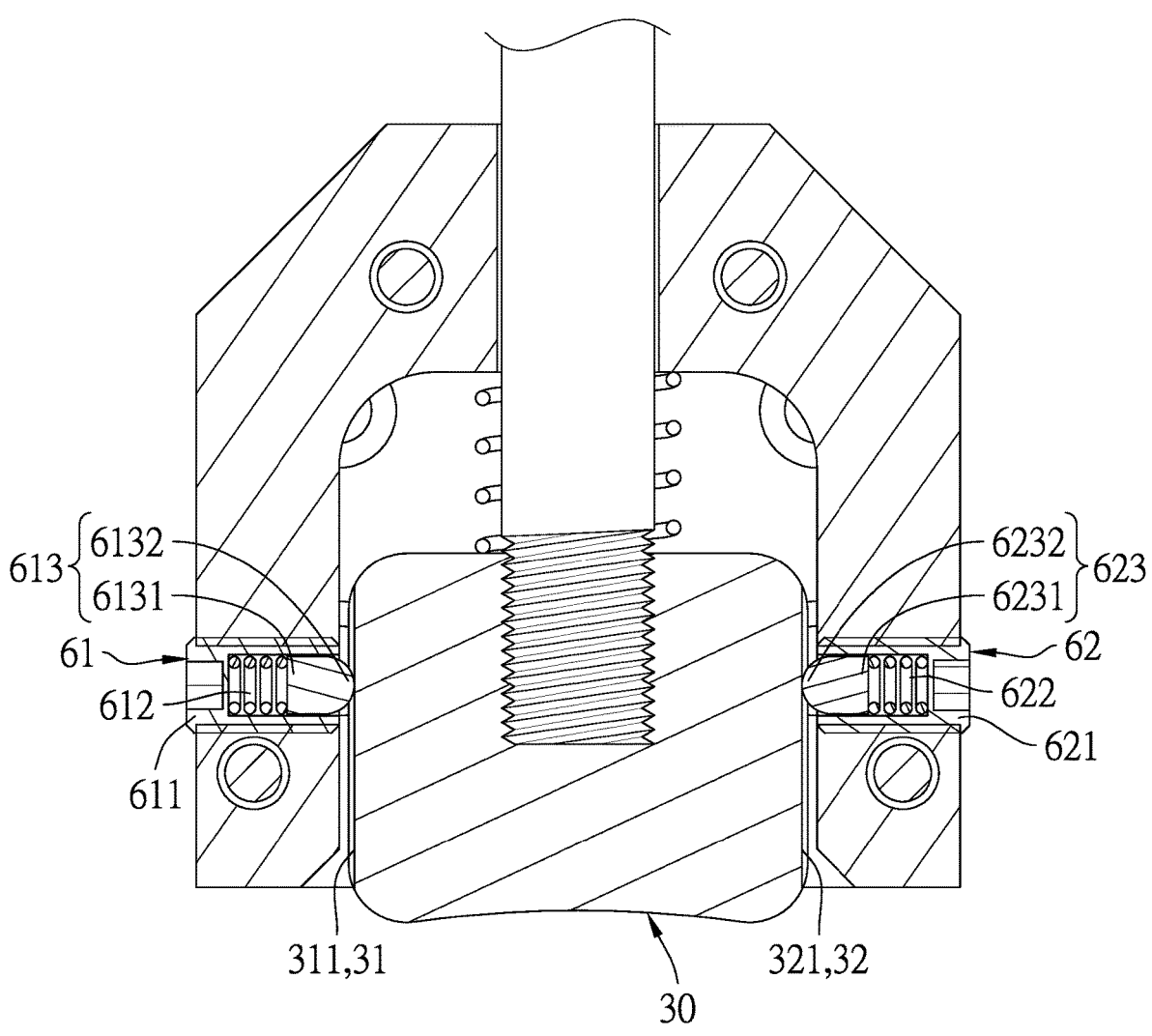
FIG. 9 is a cross-sectional view of a fourth embodiment of the present invention.

As shown in FIG. 9, the fourth embodiment of the present invention provides a brush module for a rotary table, which differs from the first embodiment in that:

The first pushing member 613 of the first pushing unit 61 includes a first column portion 6131 located within the first body 611 and pressed by the first elastic element 612, and a first arc portion 6132 connected to the first column portion 6131. The surface of the first arc portion 6132 is in an arc shape and presses against the first guiding groove 311 on the first side 31 of the brush 30. The second pushing member 623 of the second pushing unit 62 includes a second column portion 6231 located within the second body 621 and pressed by the second elastic element 622, and a second arc portion 6232 connected to the second column portion 6231. The surface of the second arc portion 6232 is in an arc shape and presses against the second guiding groove 321 on the second side 32 of the brush 30.

What is claimed is:

1. A brush module for a rotary table comprising:
   a housing including a holding groove, the holding groove including a first surface, a second surface opposite the first surface, a bottom surface located between the first surface and the second surface, and an opening opposite the bottom surface;

a brush unit including a brush, a conductive wire, and an elastic member, wherein the brush is disposed in the holding groove and includes a first side facing the first surface, a second side facing the second surface, an end face facing the bottom surface, and a contact surface opposite the end face; the conductive wire is inserted in the housing, the elastic member is sleeved on the conductive wire and pressed between the bottom surface and the end face to provide a force for pushing the brush towards the opening;

a first pushing unit disposed in the housing and including a first elastic element and a first pushing member, wherein the first pushing member presses against the first side of the brush and provides a first pushing force from the first surface towards the second surface; and a second pushing unit disposed in the housing and including a second elastic element and a second pushing member, wherein the second pushing member presses against the second side of the brush and provides a second pushing force from the second surface to the first surface;

wherein the first side of the brush includes a first guiding groove which is pressed by the first pushing member, and the second side of the brush includes a second guiding groove which is pressed by the second pushing member.

2. The brush module for the rotary table as claimed in claim 1, wherein the rotary table includes a base and a rotary disk that is rotatably disposed on the base and includes a peripheral surface, the housing is fixed on the base, and the contact surface of the brush is in electrical contact with the peripheral surface of the rotary disk.

3. The brush module for the rotary table as claimed in claim 1, wherein the elastic member is a compression spring and includes a first end pressing against the bottom surface, and a second end pressing against the end surface.

4. The brush module for the rotary table as claimed in claim 1, wherein a cross section of the first guiding groove is in circular arc shape, the first pushing member is a sphere, a radius of the cross section of the first guiding groove of the brush is about 2% larger than that of the first pushing member, a cross section of the second guiding groove is in circular arc shape, the second pushing member is a sphere, a radius of the cross section of the second guiding groove of the brush is about 2% larger than that of the second pushing member.

5. The brush module for the rotary table as claimed in claim 1, wherein the first pushing unit includes a first body fixed in the housing, said first elastic element disposed in the first body, and a first pushing member disposed in the first body and pushed by the first elastic element, the first pushing member partially protrudes from the first body, the second pushing unit includes a second body fixed in the housing, said second elastic element disposed in the second body, and a second pushing member disposed in the second body and pushed by the second elastic element, and the second pushing member partially protrudes from the second body presses against the second guiding groove on the second side of the brush.

6. The brush module for the rotary table as claimed in claim 5, wherein a spring constant of the elastic member is K1, a spring constant of the first elastic element and the second elastic element is K2, a compression amount of the elastic member is X1, a compression amount of the first elastic element and the second elastic element is X23, and the following conditions are met: K2/K1=X1/(20*X23).

7. The brush module for the rotary table as claimed in claim 1, wherein the brush further includes a third side connected between the first side and the second side, an assembly groove formed in the end face, and a filling hole that penetrates the third side and is in communication with the assembly groove, the conductive wire includes a conductive section electrically connected to the brush, the conductive section of the conductive wire is inserted in the assembly groove, and the filling hole, the assembly groove, and the conductive section are filled with a conductive material.

8. The brush module for the rotary table as claimed in claim 7, wherein the assembly groove of the brush is a threaded groove, the conductive section of the conductive wire is sleeved with a threaded socket, and the threaded socket is screwed in the assembly groove.

9. The brush module for the rotary table as claimed in claim 1, wherein the housing further includes a third surface connected between the first surface and the second surface, and a fourth surface facing the third surface, the brush further includes a third side that is connected between the first side and the second side and faces the third surface, and a fourth side opposite to the third side, the brush module of the rotary table further includes a third pushing unit and a fourth pushing unit, the third pushing unit is disposed in the housing, and includes a third pushing member which presses against the third side of the brush to provide a third pushing force from the third surface towards the fourth surface, the fourth pushing unit is disposed in the housing and includes a fourth pushing member which presses against the fourth side of the brush to provide a fourth pushing force from the fourth surface towards the third surface.

* * * * *